(12) United States Patent
Lecuyer et al.

(10) Patent No.: US 12,467,375 B2
(45) Date of Patent: Nov. 11, 2025

(54) BLADE FOR A ROTOR ASSEMBLY OF A TURBINE ENGINE

(71) Applicant: PRATT & WHITNEY CANADA CORP., Longueuil (CA)

(72) Inventors: Daniel Lecuyer, Saint-Bruno (CA); Robert Huszar, Beloeil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/779,702

(22) Filed: Jul. 22, 2024

(65) Prior Publication Data

US 2024/0375201 A1 Nov. 14, 2024

Related U.S. Application Data

(62) Division of application No. 17/200,988, filed on Mar. 15, 2021, now Pat. No. 12,070,811, which is a division of application No. 16/198,827, filed on Nov. 22, 2018, now Pat. No. 10,975,714.

(51) Int. Cl.
*F01D 11/00* (2006.01)
*F01D 5/30* (2006.01)

(52) U.S. Cl.
CPC .......... *F01D 11/006* (2013.01); *F01D 5/3007* (2013.01); *F05D 2230/12* (2013.01); *F05D 2240/55* (2013.01); *F05D 2240/80* (2013.01); *F05D 2260/30* (2013.01); *Y10T 29/4932* (2015.01)

(58) Field of Classification Search
CPC .. F01D 5/3007; F01D 11/006; F05D 2240/55; F05D 2240/80; F05D 2260/30
See application file for complete search history.

(56) References Cited

U.S. PATENT DOCUMENTS

| | | | |
|---|---|---|---|
| 3,039,740 A | 6/1962 | Hockert et al. | |
| 3,045,968 A | 7/1962 | Willis | |
| 3,572,970 A | 3/1971 | Smuland | |
| 3,689,177 A | 9/1972 | Klassen | |

(Continued)

FOREIGN PATENT DOCUMENTS

| | | |
|---|---|---|
| DE | 1953709 | 4/1970 |
| GB | 802476 | 10/1958 |
| GB | 1100860 | 1/1968 |

*Primary Examiner* — Brian Christopher Delrue
(74) *Attorney, Agent, or Firm* — NORTON ROSE FULBRIGHT CANADA LLP

(57) ABSTRACT

A blade for mounting on a rotor disc of a turbine engine includes platform segments between a airfoil and blade root and extending laterally from the blade, the platform segment having a curved profile defining a platform recess on a root side of the platform segment, the recess configured to cooperate with recesses of adjacent blades to define a blade pocket. A recessed region is defined in a rear surface of the blade root, and is configured to receive a complementary projection of the rotor disc upon mounting the blade on the rotor disc. The recessed region has a surface configured to abut a corresponding surface on the projection of the rotor disc to form a face seal. Methods of manufacturing such a rotor disc and of sealing a circumferential joint between such blades and the rotor disc are also disclosed.

6 Claims, 7 Drawing Sheets

(56) References Cited

U.S. PATENT DOCUMENTS

| | | | |
|---|---|---|---|
| 3,751,183 A * | 8/1973 | Nichols | F01D 5/22 |
| | | | 416/500 |
| 4,265,595 A * | 5/1981 | Bucy, Jr. | F01D 5/326 |
| | | | 416/221 |
| 4,668,167 A | 5/1987 | Le Maout | |
| 4,685,863 A | 8/1987 | Mclean | |
| 4,854,821 A | 8/1989 | Kernan | |
| 5,139,389 A | 8/1992 | Eng et al. | |
| 5,215,442 A | 6/1993 | Steckle et al. | |
| 5,226,784 A | 7/1993 | Mueller et al. | |
| 5,478,207 A * | 12/1995 | Stec | F01D 5/22 |
| | | | 416/500 |
| 5,823,743 A | 10/1998 | Faulkner | |
| 6,085,593 A | 7/2000 | Pileri et al. | |
| 6,171,058 B1 | 1/2001 | Stec | |
| 6,273,683 B1 | 8/2001 | Zagar et al. | |
| 6,331,097 B1 | 12/2001 | Jendrix | |
| 6,565,322 B1 * | 5/2003 | Lieser | F01D 11/006 |
| | | | 416/193 A |
| 6,575,704 B1 | 6/2003 | Tiemann | |
| 6,837,686 B2 | 1/2005 | Di Paola et al. | |
| 7,322,797 B2 | 1/2008 | Lee et al. | |
| 7,534,090 B2 | 5/2009 | Good et al. | |
| 7,762,780 B2 | 7/2010 | Decardenas | |
| 8,014,893 B2 | 9/2011 | Miki et al. | |
| 8,070,448 B2 | 12/2011 | Morris et al. | |
| 8,137,072 B2 | 3/2012 | Kim et al. | |
| 8,221,083 B2 | 7/2012 | Alvanos et al. | |
| 8,251,668 B2 | 8/2012 | Kasperski et al. | |
| 8,393,869 B2 | 3/2013 | Kim et al. | |
| 8,425,194 B2 | 4/2013 | Liotta et al. | |
| 8,734,112 B2 | 5/2014 | Virkler et al. | |
| 8,834,123 B2 | 9/2014 | Morrison | |
| 8,894,378 B2 | 11/2014 | Jayana | |
| 8,951,017 B2 * | 2/2015 | Cordier | F01D 5/282 |
| | | | 416/220 R |
| 8,967,974 B2 | 3/2015 | Garcia-Crespo | |
| 9,027,375 B2 | 5/2015 | Hennig et al. | |
| 9,246,372 B2 | 1/2016 | Kheifets | |
| 9,279,332 B2 | 3/2016 | Zhang et al. | |
| 9,296,053 B2 * | 3/2016 | Jette | F01D 5/3007 |
| 9,381,602 B2 | 7/2016 | Holmes et al. | |
| 9,759,075 B2 | 9/2017 | Bluck et al. | |
| 9,938,835 B2 | 4/2018 | Giametta et al. | |
| 10,677,073 B2 | 6/2020 | Thistle et al. | |
| 2004/0042900 A1 * | 3/2004 | Dougherty | F01D 5/3007 |
| | | | 416/97 R |
| 2007/0134099 A1 | 6/2007 | Lee et al. | |
| 2009/0257877 A1 | 10/2009 | Alvanos et al. | |
| 2010/0025379 A1 | 2/2010 | Ben Salah et al. | |
| 2010/0158686 A1 * | 6/2010 | Kim | F01D 5/3007 |
| | | | 416/500 |
| 2013/0028743 A1 | 1/2013 | Babu et al. | |
| 2014/0119916 A1 | 5/2014 | Faulder et al. | |
| 2014/0119917 A1 | 5/2014 | Tarczy et al. | |
| 2014/0119918 A1 | 5/2014 | Tarczy et al. | |
| 2014/0119943 A1 | 5/2014 | Tarczy et al. | |
| 2015/0354389 A1 | 12/2015 | Pack et al. | |
| 2016/0017737 A1 | 1/2016 | Partyka | |
| 2016/0040534 A1 | 2/2016 | Gautschi et al. | |
| 2016/0222800 A1 | 8/2016 | Kleinow | |
| 2017/0306771 A1 * | 10/2017 | Weinert | F01D 5/326 |
| 2018/0320532 A1 | 11/2018 | Whitten et al. | |
| 2020/0123912 A1 | 4/2020 | Sanzari et al. | |
| 2020/0165926 A1 | 5/2020 | Lecuyer et al. | |
| 2020/0248576 A1 | 8/2020 | Sanzari et al. | |
| 2020/0256193 A1 | 8/2020 | Palomba et al. | |

* cited by examiner

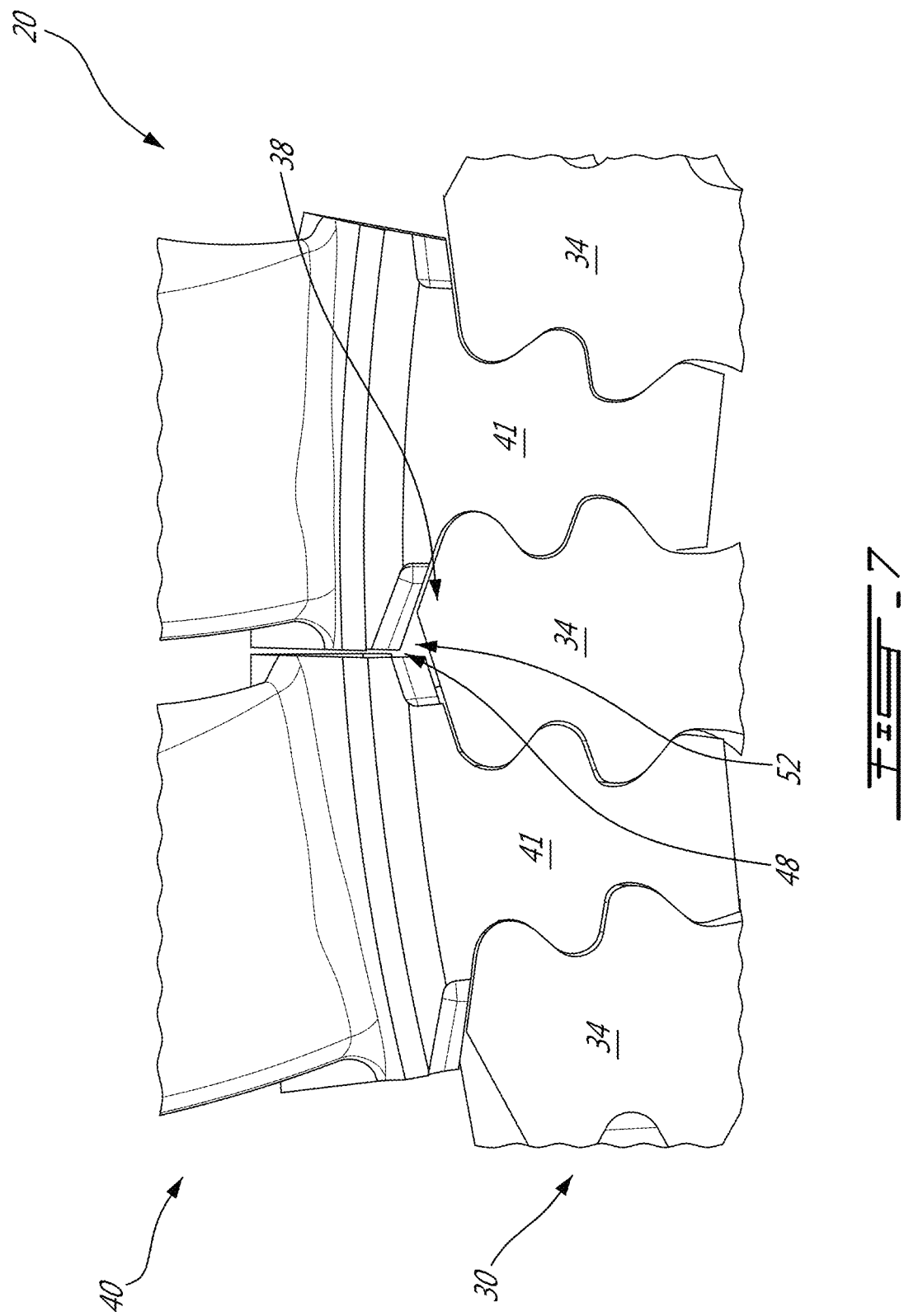

BLADE FOR A ROTOR ASSEMBLY OF A TURBINE ENGINE

CROSS-REFERENCE TO RELATED APPLICATIONS

The present application is a divisional of U.S. application Ser. No. 17/200,988 filed Mar. 15, 2021, which is itself a divisional application of U.S. application Ser. No. 16/198,827 filed Nov. 22, 2018, the entire content of each of which is incorporated herein by reference.

TECHNICAL FIELD

The application relates generally to rotors for a gas turbine engine, and more particularly to such rotors having blades removably mountable to a disc of the rotor.

BACKGROUND

Gas turbine engine rotors, used in compressor or turbines, usually include circumferentially spaced blades extending radially outwardly from a rotor disc and mounted thereto. During use, at least the blades of such rotors are disposed within an air passage and typically face an upstream flow, such as pressurized air and/or hot combustion gases, that may infiltrate interstitial spaces between attached components of the rotors. Secondary air at a lower temperature may also infiltrate these interstitial spaces between attached components of the rotors. The presence of such colder secondary air may have a positive impact on the performance and/or durability of the rotor discs, seals and/or blades of rotors. However, secondary air ingested in such interstitial spaces may leak out therefrom through air leakage paths formed at a disc/blade interface at the downstream side of the rotor. Such air leakage paths may thus limit the performance and/or durability of rotor discs, seals and/or blades of such rotors.

SUMMARY

In one aspect, there is provided a rotor assembly for a gas turbine engine, comprising: a plurality of blades having a blade root, an airfoil, and platform segments disposed between the blade root and the airfoil, the platform segments extending laterally to corresponding platform segments of adjacent blades; a rotor disc having a front face, a rear face and a peripheral surface, a plurality of slots circumferentially spaced about and formed in the peripheral surface, the slots matingly receiving the blade roots, and a plurality of fixing members extending from the front face to the rear face and circumferentially disposed between adjacent slots, the peripheral surface of the disc forming a radially outer tip of the fixing members; and a sealing tab disposed on one or more of the fixing members, the sealing tab projecting radially outward relative to the radially outer tip of the fixing members, the sealing tab axially disposed at a downstream end of the radially outer tip of the fixing members proximate the rear face of the rotor disc.

In another aspect, there is provided a blade for mounting on a rotor disc for a gas turbine engine, comprising: a blade root, an airfoil, platform segments between the airfoil and the blade root and extending laterally from the blade, the platform segments having a curved profile defining a platform recess on a root side of the platform segments, the recess configured to cooperate with recesses of adjacent blades to define a blade pocket, the blade root having a rear surface, a recessed region at least partially defined in the rear surface and configured to receive a complementary projection of the rotor disc upon mounting the blade on the rotor disc, the recessed region having a surface configured to abut a corresponding surface on the projection of the rotor disc to form a face seal.

The blade as defined above and herein may further include one or more of the following additional features, in whole or in part, and in any combination.

In certain embodiments, the recessed region is defined in a side edge of the rear surface of the blade root, such that upon mounting a plurality of the blades on the rotor disc, the recessed region of adjacent ones of the blades are adjacent to one another and form a global recessed region in the rear surface of adjacent ones of the blades, such that the recessed region of the blade root receive a portion of the projection of the rotor disc upon mounting the blade on the rotor disc.

In certain embodiments, the recessed region of the blade root is a first recessed region, the side edge of the rear surface of the blade root is a first side edge, the blade comprising a second recessed region defined in a second side edge opposite the first side edge of the rear surface of the blade root.

In certain embodiments, the recessed region has a depth adapted to correspond to an axial dimension of the projection of the rotor disc, such that the recessed region houses the projection of the rotor disc upon mounting the blade on the rotor disc whereby a rearmost surface of the projection and the rear end surface of the blade root define a continuous flat surface.

In certain embodiments, the blade root has a lobed shape corresponding to that of a slot defined in the rotor disc and in which the blade root is adapted to be received.

A rotor assembly comprising the rotor disc and a plurality of the blades mounted thereto wherein the recessed region in the blade root of a first blade of two circumferentially adjacent blades of the plurality of blades has a shaped that is different than the recessed region in the blade root of a second blade of the two circumferentially adjacent blades.

In certain embodiments, the platform segments of the two circumferentially adjacent blades cooperate to define the blade pocket under the platform segments, the blade pocket receiving secondary air from an upstream side of the rotor assembly.

In another aspect, there is provided a method of manufacturing a rotor disc for a gas turbine engine, comprising: forming a plurality of slots in a peripheral surface of the disc, the slots circumferentially spaced apart to define a fixing member extending from a front face to a rear face of the disc and circumferentially disposed between a pair of adjacent slots; forming a sealing tab on the fixing member, the sealing tab projecting radially outward relative to a radially outer tip of the fixing member, the sealing tab axially disposed at a downstream end of the radially outer tip of the fixing member proximate the rear face of the disc.

The method as defined above and herein may further include one or more of the following additional steps and/or features, in whole or in part, and in any combination.

In certain embodiments, one or both of the forming steps are performed using wire electrical discharge machining.

In certain embodiments, providing the fixing member with lobes that project circumferentially into the pair of adjacent slots, the lobes being configured to matingly receive blade roots of a blades adapted to be mounted to the rotor disc.

In certain embodiments, forming the sealing tab with an apex at a radially outermost point, a first slope surface and a second sloped surface extending radially inwardly from the apex.

In certain embodiments, forming the first sloped surface to be shorter than the second sloped surface.

In certain embodiments, forming the apex between the first sloped surface and the second sloped surface, the first slope surface and the second sloped surfaces converging to form the apex.

In certain embodiments, forming the apex in line with a radial axis extending centrally between two circumferentially adjacent slots of the rotor disc.

In certain embodiments, forming the sealing tab with a radially offset configuration, wherein the apex forming the radially outermost point on the sealing tab is circumferentially offset from a radial axis extending centrally between two adjacent slots of the rotor disc.

In certain embodiments, integrally forming the sealing tab and the rotor disc.

In another aspect, there is provided a method of sealing a circumferential joint between blades removably connectable to a rotor disc for a gas turbine engine, the circumferential joint located at an interface between the blades and the rotor disc at a downstream face thereof, the rotor disc having a front face, a rear face and a peripheral surface, a plurality of slots circumferentially spaced about and formed in the peripheral surface, and a plurality of fixing members extending from the front face to the rear face and circumferentially disposed between adjacent slots, the peripheral surface of the disc forming a radially outer tip of the fixing members, the method comprising: matingly engaging a first blade root of a first one of the blades in a first one of the slots, abutting a portion of a rear surface of the first blade root against a sealing tab projecting radially outward relative to the radially outer tip of one of the fixing members, the sealing tab axially disposed at a downstream end of the radially outer tip of the fixing members proximate the downstream face of the rotor disc, matingly engaging a second blade root of a second one of the blades in a second cone of the slots, the first and second blades circumferentially adjacent to one another, abutting a portion of a rear surface of the second blade root against the sealing tab, and securing the first and second blades to the rotor disc with retaining members.

BRIEF DESCRIPTION OF THE DRAWINGS

Reference is now made to the accompanying figures in which:

FIG. 7 is a fragmentary view of a rear face of a rotor assembly without the blade sealing tabs at the downstream side of the rotor disc as shown in FIGS. 2 to 5.

DETAILED DESCRIPTION

Figure 1:
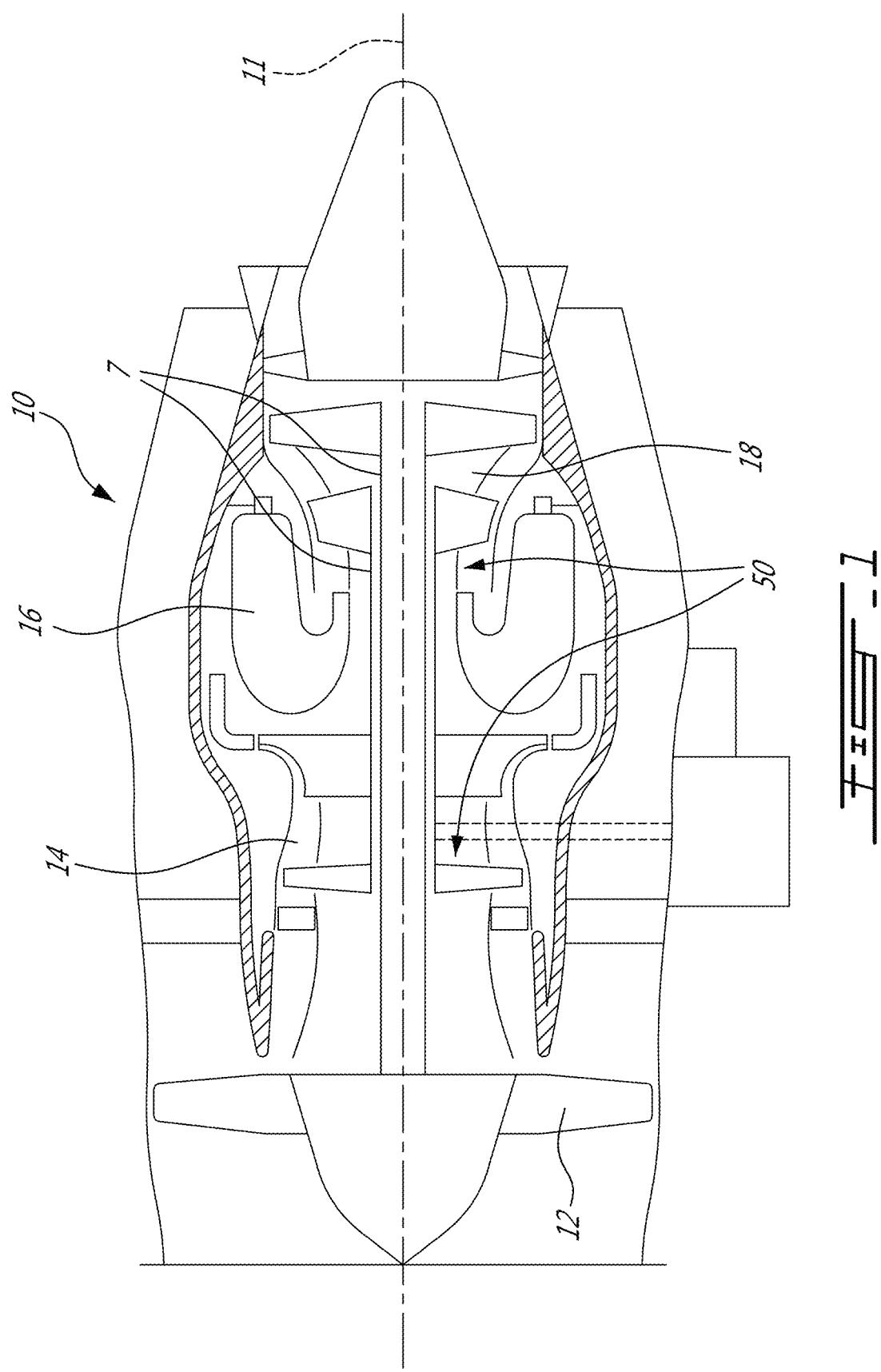
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. One or more shaft(s) 17 is/are in driving engagement with other rotating parts of the engine 10 in the compressor section 14 and the turbine section 18.

Referring to FIGS. 2 to 6, an embodiment of a rotor assembly 20 for the gas turbine engine 10 is partially shown. The rotor assembly 20 may be any suitable component of the compressor section 14 or turbine section 18 which includes a rotor disc 30 (partially shown) and rotor blades 40 surrounding and rotating with a shaft 17 along an axis 11 (FIG. 1) of the engine 10. In an embodiment, the rotor assembly 20 may form part of an axial compressor disposed in an air passage 50 of the compressor section 14. In another embodiment, the rotor assembly 20 may form part of an axial turbine disposed in a passage 50 of the combustion gases for extracting the energy from the combustion gases in the turbine section 18.

In embodiments where the rotor assembly 20 are disposed in the turbine section 18 of the engine downstream of the combustor 16, the components of the rotor assembly 20 may have to sustain high pressures and temperatures during operation of the engine 10. Such operating conditions may affect the durability of said components. Hot combustion gases and/or air upstream of the rotor assembly 20 may infiltrate interstitial spaces between components connecting/interfacing together in the rotor assembly 20. However, colder air which circulates within the engine 10 may reduce the temperature of the components in fluid communication with the hot combustion gases. In operation, such colder air (often referred to as secondary air) flowing upstream of the rotor assembly 20 may be ingested in these interstitial spaces between components connecting/interfacing together in the rotor assembly 20. Increasing said colder air retention in interstitial spaces between components of the rotor assembly 20 may be desirable in order to limit (reduce) the rate at which these components heat up during normal operation of the engine 10 and/or so as to limit the negative impacts of infiltration of hot combustion gases through these interstitial spaces on the efficiency of the gas turbine engine 10 and/or limit the negative impacts of excessive secondary air flowing through these interstitial spaces. As discussed below, components of the rotor assembly 20 may be adapted to increase the retention of secondary air at selected locations about the disc 30, more particularly at a disc/blades interface, downstream the rotor assembly 20.

In an embodiment, the rotor assembly 20 comprises a rotor disc 30 and a plurality of rotor blades 40 disposed circumferentially about and connected to the rotor disc 30. Multiple rotor assemblies 20 may be provided, each with an associated stator disposed either downstream (compressor) or upstream (turbine) of the rotor, such as to form multiple compressor or turbine stages as the case may be. These stages may correspond to compression stages or pressure stages in certain embodiments. The blades 40 may be equally circumferentially spaced apart from one another about the disc 30.

Figure 2:
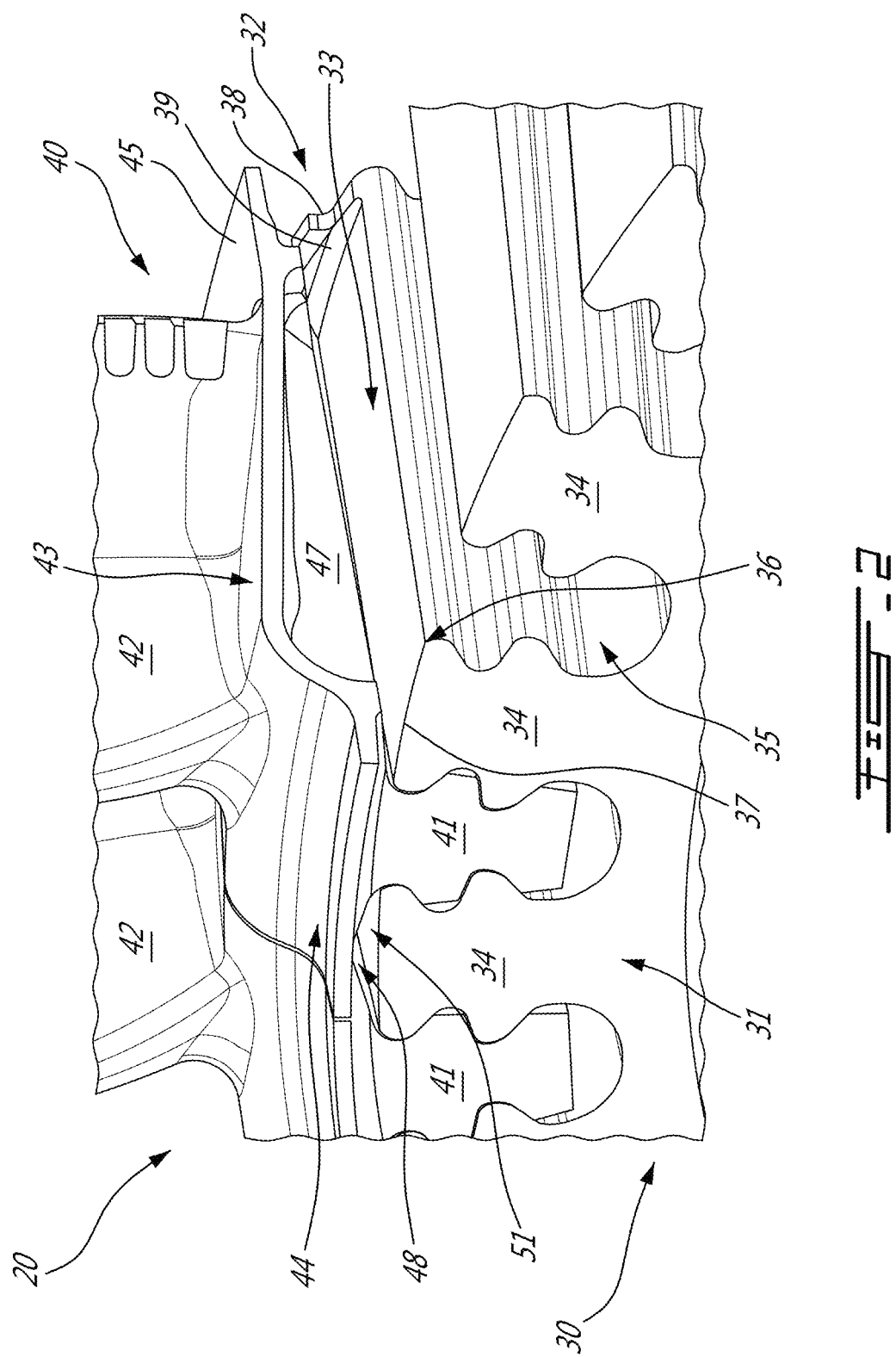
FIG. 2 is a fragmentary perspective view of a rotor assembly used in the gas turbine engine of FIG. 1.
Figure 3:
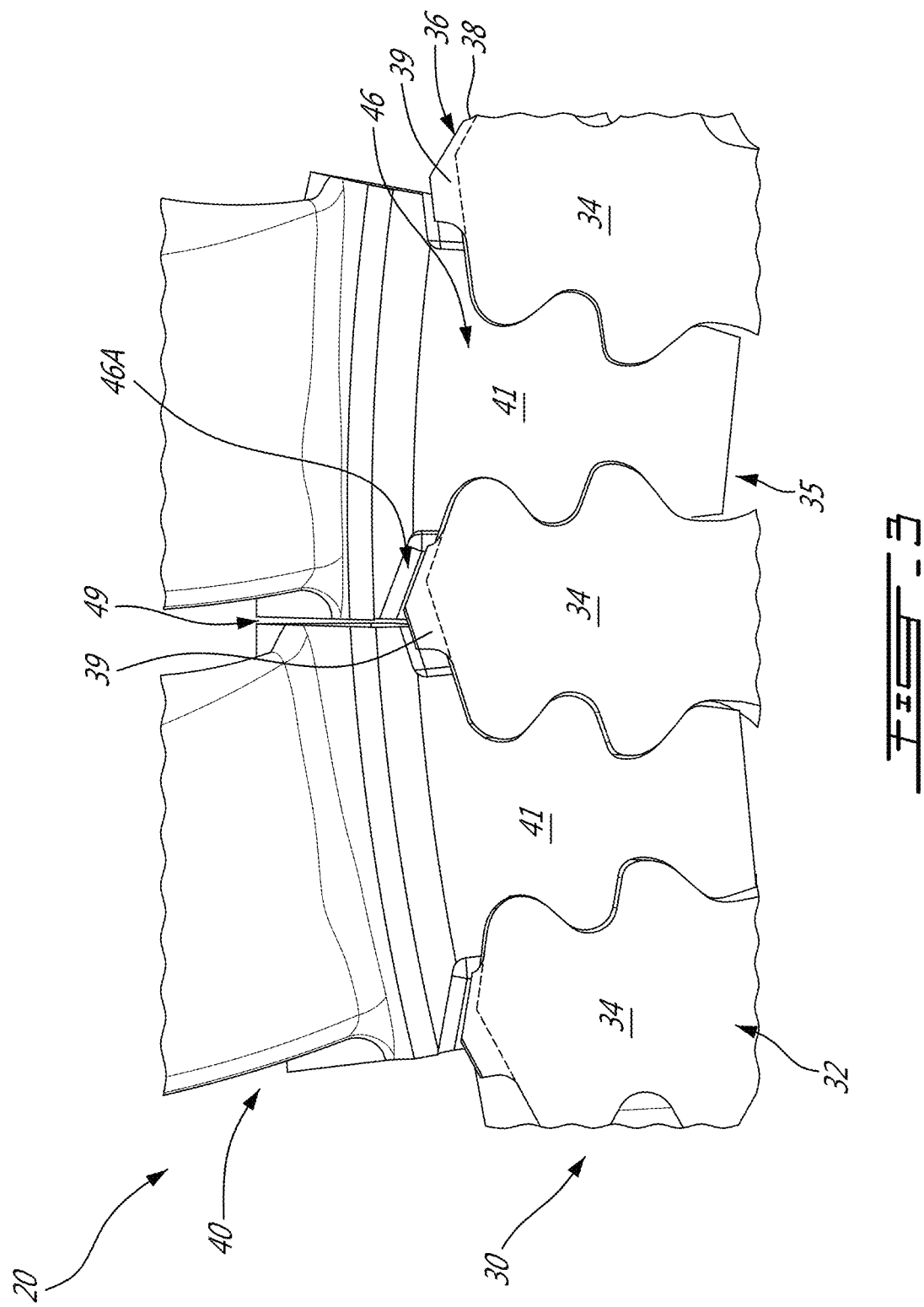
FIG. 3 is a fragmentary rear view of the rotor assembly shown in FIG. 2.

As seen in FIGS. 2 and 3, the disc 30 has a front end portion 31, an opposite rear end portion 32 axially spaced apart therefrom, and a peripheral surface 33 circumferentially extending about the disc 30 between the front end portion 31 and the rear end portion 32. The front end portion 31 defines a front face and the rear end portion 32 defines a rear face of the disc 30 between which the peripheral surface 33 of the disc 30 extends. In one particular embodiment, the front and rear faces are substantially parallel relative to each other and substantially perpendicular relative to the axis 11 of the engine 10. The front face and/or the rear face may form flat plane portions, to which the axis 11 is normal when the rotor assembly 20 is installed in the engine 10. For example, as shown at least in FIGS. 2 and 3, either or both of the front and rear faces form flat annular portions, such as a flat peripheral ring or band, where the disc 30 connects to the blades 40. In an embodiment, the rear face is a downstream surface of the rotor assembly 20 relative to a direction of the flow path of combustion gases in the turbine section 18. In another embodiment, the rear face may be the downstream surface of the rotor assembly 20 in the compressor section 14.

The disc 30 has a plurality of fixing members 34 defined therein through the peripheral surface 33 and circumferentially spaced apart from one another. As in FIG. 2, the fixing members 34 extend from the face to the rear face of the disc 30. The fixing members 34 are radial projections of the disc 30, with a said fixing member 34 being substantially radially extending. The disc 30 includes a plurality of profiled slots 35 formed in the peripheral surface 33, between pairs of adjacent ones of the fixing members 34, which are accordingly complimentarily formed by the slots 35. As depicted in FIG. 2, the slots 35 extend between the front face and the rear face of the disc 30. Therefore, the disc 30 has a circumferentially alternating sequence of fixing members 34 and slots 35. In an embodiment, the machining or fabricating of the slots 35 results in the presence of the fixing members 34. As the fixing members 34 and the slots 35 are circumferentially side by side, they have complementary shapes. As shown in FIGS. 2 and 3, the slots 35 extend from the front face to the rear face of the disc 30, in which a front slot opening and a rear slot opening are respectively defined. In some embodiments, the slots 35 may be skewed relative to a longitudinal axis of the rotor assembly 20. The slots 35 may be any suitable groove, opening and/or recess formed in the peripheral surface 33 of the disc 30 to receive a generally complementary portion of one of the blades 40, which may be a root of the blades 40 as discussed later, in order to thereby connect, secure and/or attach the blade 40 onto the disc 30.

In an embodiment, the fixing members 34 have a profiled contour which may be, for example, formed by a series of lobes having increasing circumferential widths from the radially outermost lobe ("top lobe"), to the radially innermost lobe ("bottom lobe"), with, in some cases, a radially central lobe ("mid lobe") disposed therebetween and having an intermediate lobe width. Such a multi-lobed profiled contour is typically referred to as a "firtree" (or "fir tree"), because of this characteristic shape. It is to be understood from the above that the slots 35 may have a complementary firtree shape, as in some embodiments side walls of the slots 35 may define a respective side of the profiled contour of the fixing members 34. Whether or not in the shape of a firtree or lobes, the fixing members 34 and slots 35 define mechanical interferences that form abutments that prevent a radial outward movement of blades 40 connected to the disc 30.

As visible in FIG. 2, in an embodiment, opposite sides of the profiled contour of the fixing members 34 join at a radially outer tip 36 of a respective one of the fixing members 34 to form a planar top surface. The peripheral surface 33 of the disc 30 forms the radially outer tip 36 of the fixing members 34. Stated differently, the top surfaces of the fixing members 34 form respective flat portions of the peripheral surface 33 of the disc 30. Such flat portions may extend from a leading edge 37 of the peripheral surface 33 of the disc 30 towards a trailing edge 38 of the peripheral surface 33. The fixing members 34 and slots 35 may have other profiled shapes in some embodiments.

Referring to FIGS. 2 to 6, the rotor disc 30 has sealing tabs 39 defined in the rear end portion 32, proximate the rear face of the rotor disc 30. More specifically, the sealing tabs 39 project radially outward relative to the radially outer tip 36 of the fixing members 34, and the sealing tabs 39 are axially disposed at, or near to, a rear (i.e. downstream) end of the radially outer tip of the fixing members 34 of the disc 30. The sealing tabs 39 are circumferentially disposed between the slots 35. Stated differently, the sealing tabs 39 protrude radially out from the remainder of the peripheral surface 33, at radially outer tip 36 of the fixing members 34. In the depicted embodiment, the sealing tabs 39 are integral parts of the disc 30 (i.e. an integral portion of a respective one of the fixing members 34), however the sealing tabs 39 may alternately be a separately formed part added/connected to the rear end portion 32 of the disc 30 in alternate embodiments. Due to the presence of the sealing tabs 39 that project from the peripheral surface 33 of the disc 30, more particularly at the radially outer tip 36 of the fixing members 34 proximate the rear face of the rotor disc 30, a circumference of the disc 30 increases at the radially outer tip 36 of the fixing members 34, at the trailing edge 38 of the peripheral surface 33 of the disc 30. This can be seen in FIG. 4, for example.

Figure 5:
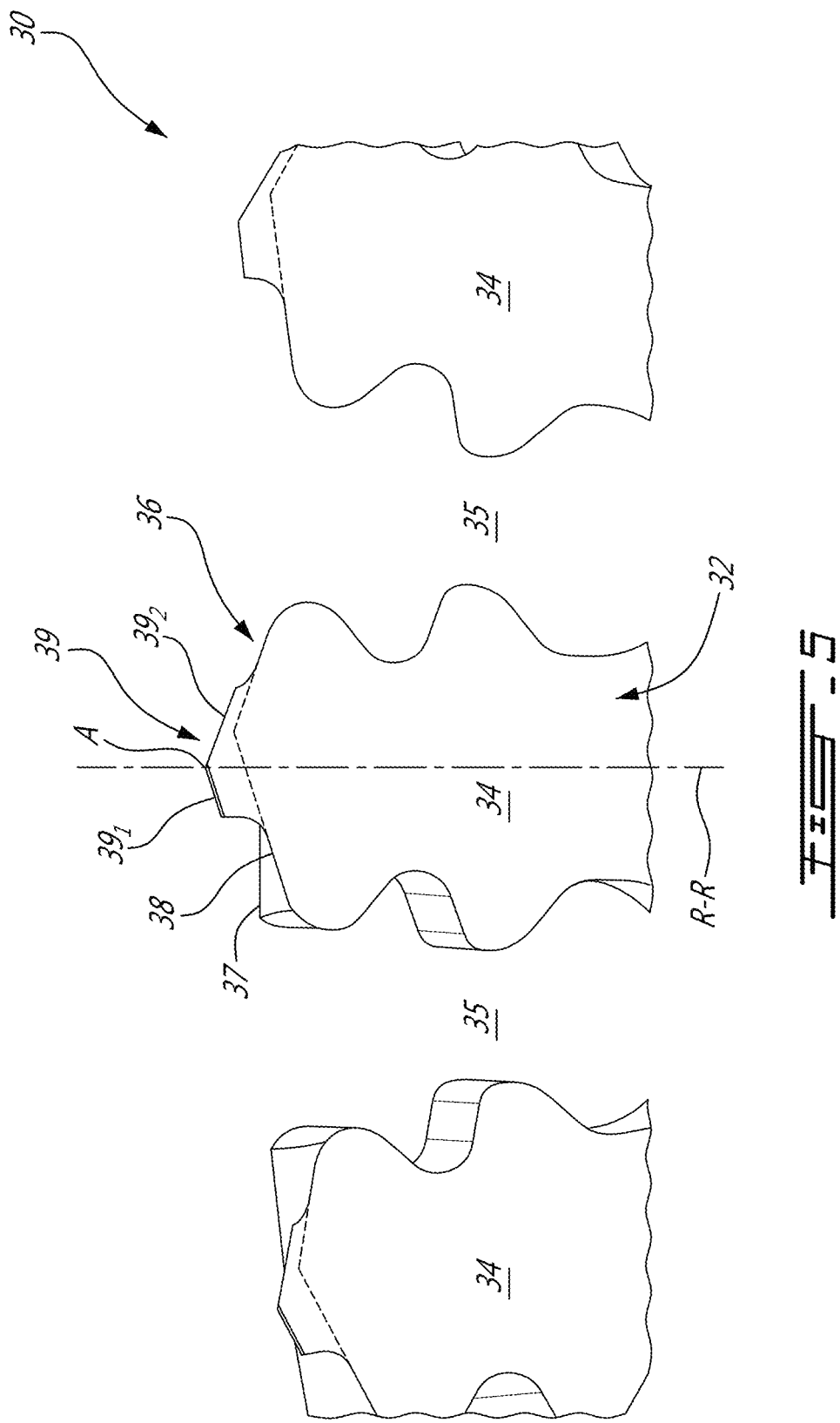
FIG. 5 is a fragmentary view of a rear face of the rotor disc shown in FIGS. 2 and 3, showing an example of blade sealing tabs.

As seen in FIG. 5, the sealing tabs 39 in the depicted embodiment have a generally pointed shape when viewed from the downstream side of the rotor disc 30, although they can be rounded in other embodiments, and include an apex A forming a radially outermost point and from which sloped surfaces $39_1$, $39_2$ extend radially inwardly. As best shown in FIGS. 3 and 5, in a particular embodiment, a cross-section of the sealing tabs 39 when viewed from the downstream side of the rotor disc 30 is asymmetrical, although it may be symmetrical in other embodiments. In other words, in a particular embodiment, an outer periphery of the sealing tabs 39 defines the apex A between the opposing sloped surfaces $39_1$, $39_2$, which are not identical in shape, such that the sloped surface $39_1$ is shorter than the sloped surface $39_2$ (or vice versa in other cases). More particularly, as depicted in FIG. 5, the apex A of the sealing tabs 39 is located between the first sloped surface $39_1$ and the second sloped surface $39_2$, both sloped surfaces $39_1$, $39_2$ converging to form the apex A, and where the apex A is in line with a radial axis R-R extending centrally between two adjacent slots 35 of the rotor disc 30, the position of which is dictated by the shape of the airfoil and the degree of fixing rotation. This may help sealing the downstream end of the blade pockets 48 formed between the rotor disc 30 and the blade roots 41, at a circumferential joint between two adjacent blade platform segments 43, as discussed later below. In some embodiments, the sealing tab 39 may also have a radially offset configuration, wherein the apex A forming the radially outermost point on the sealing tab 39 is circumferentially offset from the radial axis R-R. It is to be understood that the apex A may thus be located off (i.e. offset from) the radial axis R-R, between two adjacent slots 35 of the rotor disc 30. The exact location of the apex A may depend on the geometrical aspects of the blade 40, such as the airfoil shape, blade stagger, the location of the inter-blade gap, and/or the shape of an air leakage path 52 (discussed below) typically located between adjacent blade root 41 (see the example shown in FIG. 7).

The complex shapes of the sealing tabs 39 projecting from the disc 30 as integral part thereof, as discussed above, may be manufactured using any suitable machining technique. In one particularly embodiment, however, wire electrical discharge machining (WEDM), also known as wire-cut EDM and/or wire-cutting, is used to form the sealing tabs 39 on the disc 30. Such wire EDM manufacturing may facilitate machining of such complex shapes, which would not be as easily achieved or practical by broaching or other machining processes (or would at least necessitate additional manufacturing steps in order to obtain the appropriate shape of the sealing tabs 39).

Returning to FIG. 2, the blade 40 has a blade root 41, an airfoil 42 and a platform or platform segments 43 radially disposed between the blade root 41 and the airfoil 42, the platform segments 43 extending laterally to (into opposing relationship with) corresponding platform segments 43 of adjacent ones of the blades 40. These portions of the blade 40 may all merge together to form a single piece blade 40, though a multi-piece configuration is also possible.

The blade root 41 of the blade 40 may be received in a corresponding slot 35 of the disc 30. The root 41 has a shape and size that dovetail with the shape and size of the corresponding slot 35. The size of the blade roots 41 is slightly smaller than or equal to the size of the slots 35 to allow the blade roots 41 to slide within the slots 35 when connecting the blades 40 to the disc 30. Once received in the slot 35, the blade root 41 may be secured therein with a retaining member (not shown). The retaining member may be any fastening structure such as a retaining ring, a rivet connector or any other suitable types of retaining member that may secure the blade roots 41 inside respective slots 35 to prevent axial movement between the blade roots 41 and the slots 35 in at least one direction, for instance the direction opposite the insertion direction of the blade root 41 within the slot 35.

The airfoil 42 of the blade 40 extends generally or partially transversally to the direction of the flow path of air/combustion gases in the air/combustion gases passage 50. The airfoil 42 has a profiled shape adapted to generate a pressure/velocity differential across the rotor assembly 20 (or a section thereof) when air/combustion gases flow across the airfoils 42 when the rotor assembly 20 rotates during operation of the engine 10.

Figure 6:
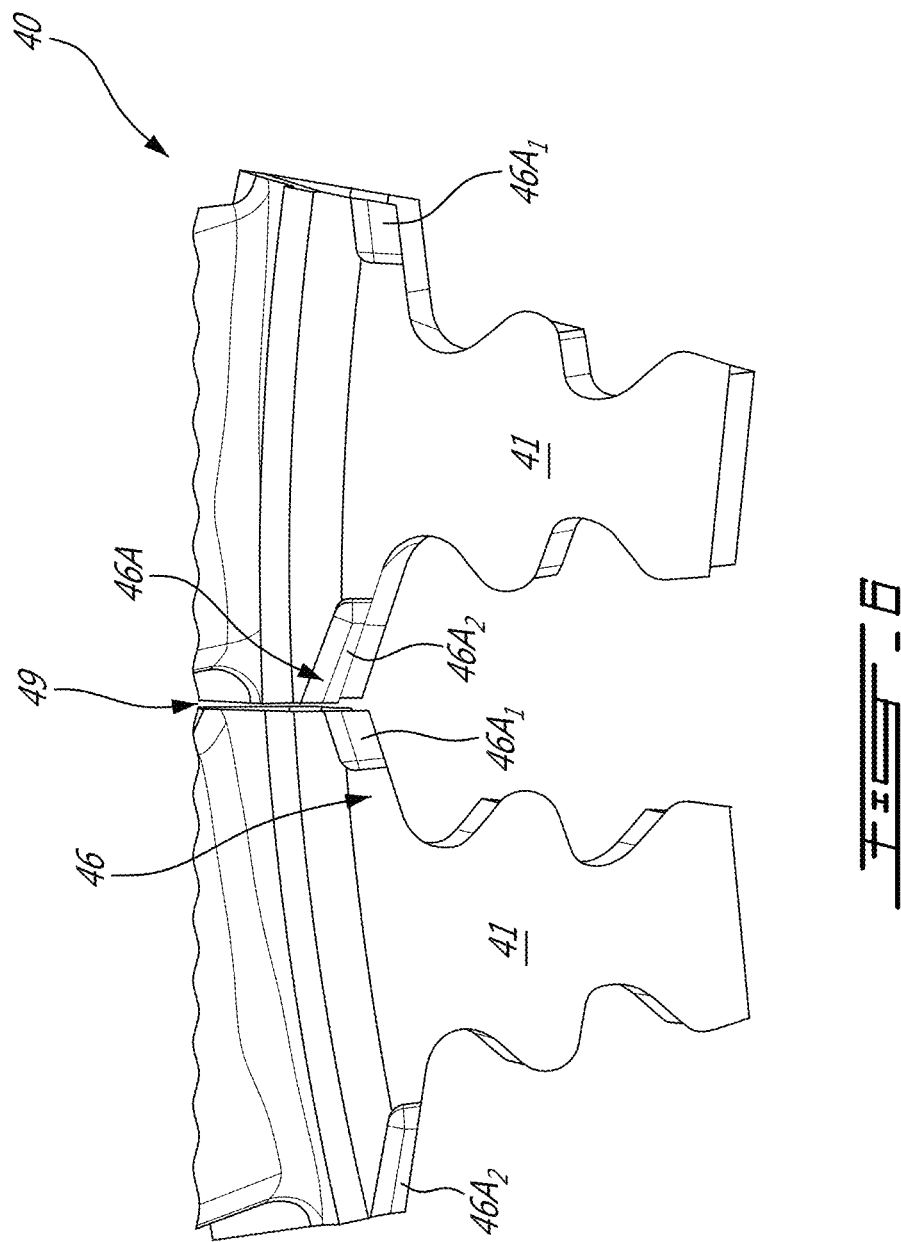
FIG. 6 is a fragmentary view of a rear face of adjacent blades of FIGS. 2 and 3, showing root portions of the blades.

The platform segment 43 has a curved profile forming a leading flange 44 protruding forwardly and a trailing flange 45 protruding rearwardly. As shown in FIG. 2, the curved profile defines a platform recess 47 on the root side of the platform segment 43 (underneath the platform segment 43). When the blades 40 are mounted on the disc 30, corresponding platform segments 43 of adjacent ones of the blades 40 mate in opposing relationship, such that the platform recesses 47 on the root side of the corresponding platform segments 43 together define a blade pocket 48, i.e., a global recess 48. Stated differently, the pockets 48 are circumscribed by adjacent platform segments 43 of respective adjacent blades 40 and the peripheral surface 33 of the disc 30 when the blades 40 are mounted thereon. In some embodiments, the pocket 48 may contain a feather seal (not shown) that may seal a circumferential gap 49 (see FIGS. 3 and 6) defined between side edges of adjacent platform segments 43. More particularly, as depicted in FIGS. 3 and 6, such gap 49 extends from the leading flange 44 to the trailing flange 45, along sides edges of adjacent platform segments 43. Such seal (not shown) may contribute to minimizing air leakage between components of the rotor assembly 20, in this case adjacent blades 40 between their respective platform segments 43.

As shown in FIG. 2, a frontal opening 51 is defined between the adjacent platform segments 43 and the top surface of the fixing members 34 when the blades 40 are mounted on the disc 30. Secondary air may thus enter by such frontal opening 51 and be ingested in the pockets 48. In typical rotor assemblies, an example of which is shown in FIG. 7 and viewed from the downstream side thereof, an air leakage path 52 may be at a location generally coinciding with the trailing edge 38 of the peripheral surface 33 of the disc 30 (i.e. at the rear face of the disc 30, at the radially outer tip 36 of the fixing members 34). Such leakage paths 52 may allow the secondary air ingested in the pockets 48 to exit rearwardly out of the pockets 48. More particularly, the leakage paths 52 are located at an interface (i.e. where surfaces generally mate with one another) between rigid components, at the trailing edge 38 of the peripheral surface 33 (downstream side) of the disc 30. Typically, such paths 52 are minimal in size and may be due to manufacturing tolerances, although generally tight, and/or due to shapes of complementary removably connectable components that may be complex to manufacture. Such paths 52 may also be due to limitations inherent to the manufacturing process. For instance, where typical discs are broached (i.e. manufactured by broaching), the resulting shape of the discs 30 may be limited by the broach shape (i.e. tool shape), which may result in residual leakage paths 52, independently from manufacturing tolerances. One factor accounting for the presence of the leakage path 52 shape may also be the result of the asymmetric nature of the complementary geometry between blades 40, often involving complex manufacturing. As such, for assembling removably connectable components together, such as blades 40 onto the disc 30, the mating surfaces of complementary components, although complementary, may not perfectly conform (e.g. they may not contact over full surfaces) to one another. The manufacturing tolerances may also be present in consideration of thermal expansion/contraction of the components during operation of the engine 10, whereas the manufacturing limitations are inherent to the typical manufacturing process performed. There may be more than one path 52, each proximate the rear face of the rotor disc 30, between the radially outer tip 36 of a respective one of the fixing members 34 and the blade roots 41 of adjacent blades 40 mounted on the disc 30, whether or not the fixing members 34 are all identical to one another.

The sealing tabs 39 block these air leakage paths 52, and thus prevent (prevent or minimize) leakage of the secondary air ingested in the pockets 48 out the air leakage paths 52, at the rear (downstream side) of the disc 30, which would otherwise occur in typical rotor assemblies without the sealing tabs 39. The presence of the sealing tabs 39 may thus contribute to reducing the temperature of the blades 40, and by thermal conduction the disc 30, in fluid communication with the hot combustion gases. During normal operation of the engine 10, the secondary air flowing upstream of the rotor assembly 20 may thus be ingested and at least partially entrapped inside the pockets 48, thereby creating a positive pressure differential inside the pockets 48 limiting the amount of hot combustion gases flowing therein. To this end, with further reference to FIGS. 3 to 6, the sealing tabs 39 overlap a rear surface 46, which is a downstream surface, of two adjacent blade roots 41. More specifically, an axially upstream flat surface 39A of the sealing tab 39 forms a face seal (axial seal) by registering with the rear surface 46 of two adjacent blade roots 41 when the upstream flat surface 39A of the sealing tab 39 abuts the rear surface 46 of the two adjacent blade roots 41. In an embodiment, such overlap is in a recessed region 46A defined in each of the two adjacent blade roots 41, so as to form the face seal. More specifically, as depicted in FIG. 6, the recessed region 46A is defined in a side edge of the rear surface of the blade root 41, radially under the trailing flange 45 of the blade 40, where the blade root 41 merges with the platform segments 43 of such blade 40, That is, upon mounting a plurality of the blades 40 on the rotor disc 30, the recessed region 46A of adjacent ones of the blades are adjacent to one another and form a global recessed region in the rear surface of adjacent ones of the blades adapted to axially receive the sealing tab 39 of the rotor disc 30. As shown, the recessed region $46A_1$ (i.e. a respective portion of the global recessed region) defined in a side edge of a first one of the blades 40 and the recessed region $46A_2$ (i.e. a respective portion of the global recessed region) defined in a side edge of a second one of the blades 40 adjacent the first one of the blades 40 together form such global recessed region to axially receive the sealing tab 39 of the rotor disc 30. Also, as visible in FIG. 6, the blade root 41 has another recessed region 46A defined in an opposite side edge to form another global recessed region with a corresponding recessed region 46A with an adjacent ones of the blades 40.

In such embodiment, the sealing tabs 39 of the rotor disc 30 and respective recessed regions 46A of the blade roots 41 may have a complementary shape. More specifically, the contour of the outer periphery of the sealing tabs 39 may correspond to that of the recessed region 46A on the rear surface 46 of the blades 40. This may contribute to enhancing the downstream sealing efficiency between the sealing tabs 39 and the blades 40.

Figure 4:
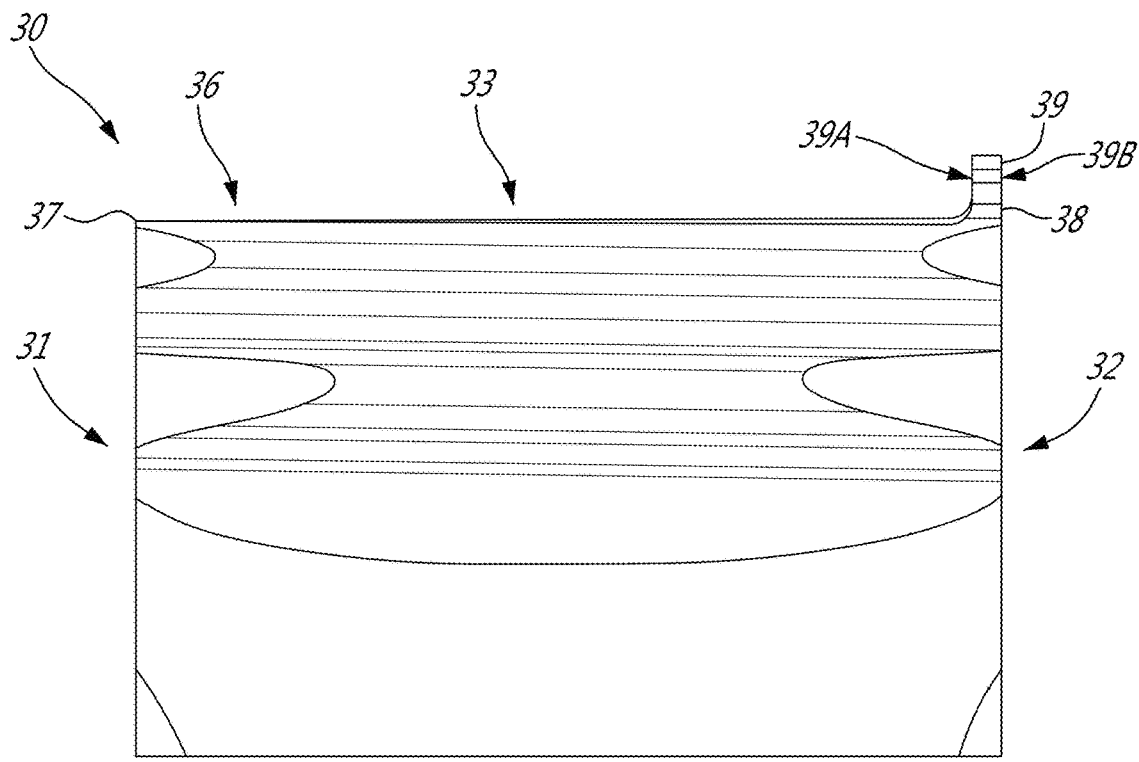
FIG. 4 is a fragmentary side view, partly cutaway, of the rotor disc shown in FIGS. 2 and 3.
Figure 4A:
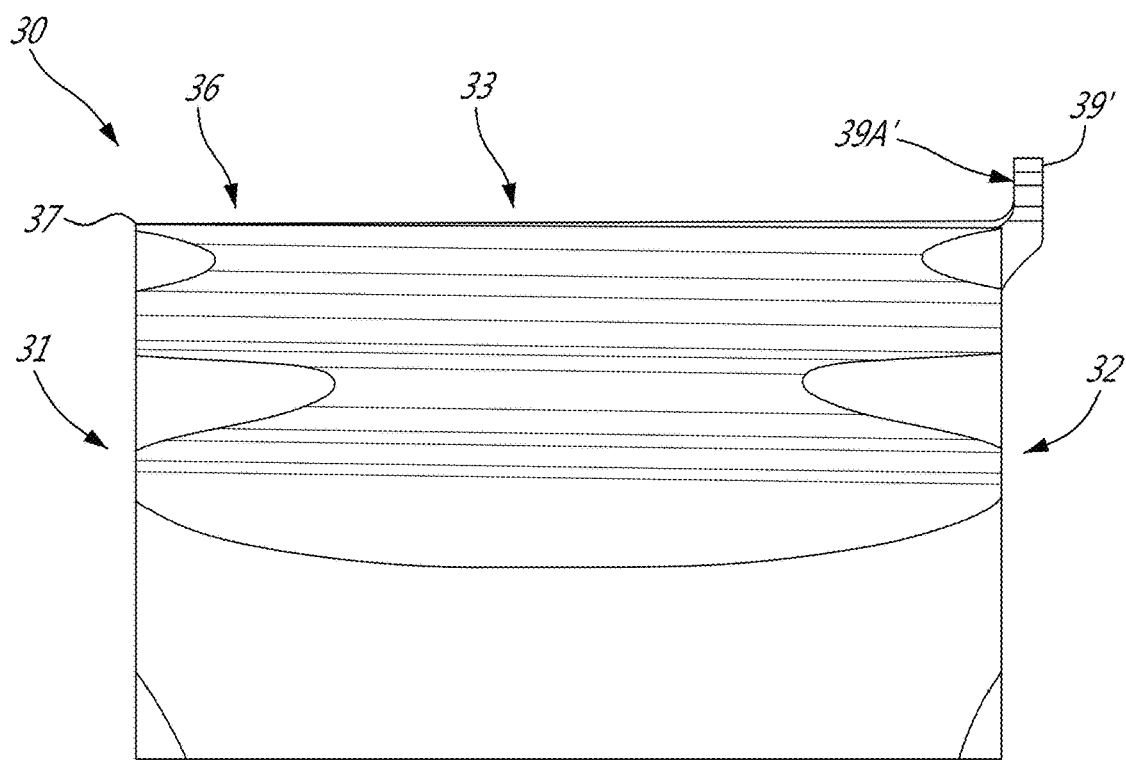
FIG. 4A is a fragmentary side view, partly cutaway, of a variant of the rotor disc shown in FIGS. 2 and 3.

In embodiments where the sealing tabs 39 are asymmetrical, as discussed above, the shape of a respective recessed region 46A of the rear surface 46 of the blades 40 registering with a corresponding sealing tab 39 may be adapted to conform to the outer periphery of said asymmetrical sealing tab 39. That is, portions of the recessed regions 46A defined in adjacent blades 40 may thus not be identical in shape and/or size to accommodate to the complementary shape of the sealing tabs 39 registering therewith. This is visible at FIG. 6, where a first recessed region 46A1 defined in the rear surface 46 of a respective one of the blade roots 41 has a different shape than that of a second recessed region 46A2 defined in the rear surface 46 of an adjacent one of the blade roots 41, such first and second recessed regions 46A1, 46A2 defining the global recessed region 46A receiving the sealing tab 39. A rearmost surface 39B of the sealing tabs 39, which corresponds in FIG. 6 to the rear end surface of the disc 30, may be flush with the rear surface 46 of the blade roots 41 surrounding the recessed region 46A. Or, stated differently, the rear end surface 46 of the blade root 41 is flush with the rearmost surface 39B of the projection (sealing tabs) 39. This is shown in FIG. 3, for example. This may allow evenness between the downstream surface 46 of the blade roots 41 and the rear face of the disc 30, including the rearmost surface of the sealing tabs 39. In other words, the sealing tabs 39 may be housed inside the recessed region 46A, such that its rearmost surface 39B and the downstream surface 46 surrounding it may form a continuous flat surface. The recessed region 46A has a depth corresponding to an axial dimension (i.e. a thickness extending in the axial direction of the disc) of the sealing tab 39, such that the recessed region 46A may house the sealing tab 39 of the rotor disc 30 upon mounting the blade on the rotor disc 30 and the rearmost surface 39B. This may be different in other embodiments. For instance, the axial dimension of the sealing tab 39 may be smaller than the depth of the recessed region 46A, whereby the sealing tab 39 would still be housed in the recessed region 46A. In another embodiment, the sealing tab 39 may be offset rearward with respect to the rear face of the disc 30 at the tip portion 36 thereof, such that the sealing tab 39' may protrude rearwardly from the rear face of the disc 30, such as illustrated in FIG. 4A, and the blade roots 41 may be free from recess in their downstream surface 46. In such configuration, the sealing tab 39', more specifically its surface 39A', may still sealingly face the downstream surface 46 of two adjacent ones of the blade roots 41 and provide the sealing benefits discussed above. This configuration may simplify the manufacturing of the blades 40/blade roots 41, although it changes the overall geometry of the disc 30 and may cause additional manufacturing complications. Yet, in other embodiments, for instance where there is no recessed regions 46A in the downstream surface 46, the downstream surface 46 may include a fillet (e.g. a raised edge line) defined thereon and configured to contour the periphery of the sealing tab 39, such that the sealing tab 39 may form a face seal with the downstream surface 46 as it abuts thereon, and the sealing tab 39 may additionally have said fillet following its periphery. Stated differently, the sealing surface of the face seal defined between the sealing tab 39 and the downstream surface 46 of adjacent blade roots 41 may be recessed and/or surrounded by the fillet. As such, the presence of the fillet may improve the sealing efficiency of the face seal formed by the sealing tab 39 and the downstream surface 46, in such embodiments.

As understood from above, the sealing tabs 39 projecting radially outward relative to the radially outer tip 36 of the fixing members 34, and axially disposed at the downstream end of the radially outer tip 36 of the fixing members 34 proximate the rear face of the rotor disc 30 also act as axial abutments for the blades 40, more particularly the blade roots 41, when the blades 40 are mounted inside the slots 35 of the disc 30. For instance, when the blades 40 are being mounted to the disc 30, the blades 40 slide in respective slots 35 until the rear surface 46, or a portion of the recessed region 46A of that surface when present, of the blades 40 abuts against the sealing tabs 39. Such abutments may prevent the blades 40 from moving axially (e.g. in the upstream-downstream direction) and may facilitate the axial retention of the blades 40 inside the slots 35, but more importantly improve the downstream sealing efficiency between the blades 40 and the disc 30 because of the sealing tabs 39 shape and engagement with a complementary portion of the blades 40, as discussed above. In other words, the sealing tabs 39 may thus provide not only axial positioning means of the blades 40 within the slots 35 to facilitate installation of the blades 40 on the rotor disc 30, but also provide improved downstream sealing efficiency of the rotor assembly 20, between the blades 40 and the rotor disc 30, such as to reduce secondary air flow leakage out the rear of the blade pockets 48 defined between the blades 40 and the rotor disc 30, because of its particular shape and complementarity with portions of the blade roots 41, as discussed above.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A blade adapted for mounting on a rotor disc for a gas turbine engine, the blade comprising:
    a blade root;
    an airfoil;
    platform segments between the airfoil and the blade root and extending laterally from the blade, the platform segments having a curved profile defining a platform recess on a root side of the platform segments, the recess configured to cooperate with recesses of adjacent blades to define a blade pocket; and
    the blade root having a rear surface, a recessed region at least partially defined in the rear surface, the recessed region having a surface forming a face seal, the recessed region being adapted to abut a corresponding surface on a projection of the rotor disc, the recessed region being recessed into the rear surface of the blade root by a depth, the depth adapted to correspond to an axial dimension of the projection of the rotor disc, such that the recessed region is adapted to house the projection of the rotor disc, whereby the rear end surface of the blade root is adapted to be flush with a rearmost surface of the projection.

2. The blade as defined in claim 1, wherein the recessed region is defined in a side edge of the rear surface of the blade root, such that upon mounting a plurality of the blades on the rotor disc, the recessed region of adjacent ones of the blades are adjacent to one another and form a global recessed region in the rear surface of adjacent ones of the blades, such that the recessed region of the blade root receive a portion of the projection of the rotor disc upon mounting the blade on the rotor disc.

3. The blade as defined in claim 2, wherein the recessed region of the blade root is a first recessed region, the side edge of the rear surface of the blade root is a first side edge, the blade comprising a second recessed region defined in a second side edge opposite the first side edge of the rear surface of the blade root.

4. The blade as defined in claim 1, wherein the blade root has a lobed shape.

5. A rotor assembly comprising the rotor disc and a plurality of blades mounted thereto, each of the plurality of blades being the blade of claim 1, wherein the recessed region in the blade root of a first blade of two circumferentially adjacent blades of the plurality of blades has a shape that is different than the recessed region in the blade root of a second blade of the two circumferentially adjacent blades.

6. The rotor assembly of claim 5, wherein the platform segments of the two circumferentially adjacent blades cooperate to define the blade pocket under the platform segments, the blade pocket receiving secondary air from an upstream side of the rotor assembly.

* * * * *